United States Patent
Michel et al.

(10) Patent No.: US 8,209,716 B2
(45) Date of Patent: Jun. 26, 2012

(54) APPARATUS AND METHOD FOR MANAGING VIDEO AUDIO SETTING INFORMATION AND PROGRAM

(75) Inventors: Xavier Michel, Chiba (JP); Kazuhiko Ueda, Kanagawa (JP); Masuyoshi Kurokawa, Kanagawa (JP); Koji Aoyama, Saitama (JP)

(73) Assignee: Sony Corporation, Tokyo (JP)

( * ) Notice: Subject to any disclaimer, the term of this patent is extended or adjusted under 35 U.S.C. 154(b) by 499 days.

(21) Appl. No.: 12/248,838

(22) Filed: Oct. 9, 2008

(65) Prior Publication Data

US 2009/0213273 A1 Aug. 27, 2009

(30) Foreign Application Priority Data

Oct. 15, 2007 (JP) ................. 2007-268203

(51) Int. Cl.
*G06F 13/00* (2006.01)
*G06F 3/00* (2006.01)
*H04N 5/445* (2011.01)

(52) U.S. Cl. .......................... 725/38; 725/37
(58) Field of Classification Search .............. 725/38, 725/32

See application file for complete search history.

(56) References Cited

U.S. PATENT DOCUMENTS

| | | | |
|---|---|---|---|
| 6,263,502 B1 * | 7/2001 | Morrison et al. | 725/47 |
| 7,576,744 B2 * | 8/2009 | Kurumisawa | 345/501 |
| 2003/0007001 A1 * | 1/2003 | Zimmerman | 345/716 |
| 2003/0066080 A1 * | 4/2003 | Kamieniecki | 725/80 |
| 2004/0243940 A1 * | 12/2004 | Lee et al. | 715/744 |
| 2004/0263639 A1 * | 12/2004 | Sadovsky et al. | 348/222.1 |
| 2005/0086692 A1 * | 4/2005 | Dudkiewicz et al. | 725/46 |
| 2005/0207332 A1 * | 9/2005 | Aoki | 370/200 |
| 2005/0286061 A1 * | 12/2005 | Kurumisawa | 358/1.9 |
| 2006/0212479 A1 * | 9/2006 | Habas et al. | 707/104.1 |
| 2006/0259615 A1 * | 11/2006 | Beniya | 709/224 |
| 2007/0209047 A1 * | 9/2007 | Hallberg et al. | 725/9 |
| 2007/0220582 A1 * | 9/2007 | Hallberg et al. | 725/135 |
| 2008/0005696 A1 * | 1/2008 | Shivaji-Rao | 715/822 |
| 2008/0040430 A1 * | 2/2008 | Shivaji-Rao | 709/205 |

FOREIGN PATENT DOCUMENTS

JP 2007-25294 2/2007

* cited by examiner

*Primary Examiner* — Pankaj Kumar
*Assistant Examiner* — Mulugeta Mengesha
(74) *Attorney, Agent, or Firm* — Finnegan, Henderson, Farabow, Garrett & Dunner, L.L.P.

(57) ABSTRACT

A setting information database associates setting information used to output a video signal or an audio signal with a corresponding viewing condition. A setting information registration unit registers setting information and a corresponding viewing condition which have been received by a setting information reception unit so as to store them in the setting information database. An adequacy determination unit determines the adequacy of recommended setting information to be stored in the setting information database. A condition extraction unit extracts pieces of setting information stored in the setting information database on the basis of a viewing condition supplied from an extraction condition reception unit. A recommendable setting derivation unit derives recommendable setting information from the extracted pieces of setting information.

7 Claims, 12 Drawing Sheets

FIG. 5

|  |  | CASE #1 | CASE #2 | CASE #3 | ... |
|---|---|---|---|---|---|
| VIEWING CONDITIONS | AGE | 20 | 40 | 30 | ... |
|  | SEX | MALE | MALE | FEMALE | ... |
|  | AREA OF RESIDENCE | TOKYO | OSAKA | HOKKAIDO | ... |
|  | VIEWING ENVIRONMENT | FLUORESCENT LIGHTING | FLUORESCENT LIGHTING | INDIRECT LIGHTING | ... |
|  | TYPE OF CONTENT | ANIME | SPORT | MOVIE | ... |
|  | MODEL | ABC-14 | DEF-37 | GHJ-42 | ... |
| SETTING INFORMATION | BRIGHTNESS | 50 | 50 | 40 | ... |
|  | CONTRAST | 50 | 40 | 60 | ... |
|  | SHARPNESS | 50 | 60 | 40 | ... |
|  | MODE | OFF | SPORT | MOVIE | ... |
|  | NOISE REDUCTION | OFF | MEDIUM | LOW | ... |

FIG. 8

```
PLEASE INPUT VIEWING CONDITIONS
                731                          732
AGE                          20            ▽
SEX                          MALE          ▽
AREA OF RESIDENCE            TOKYO         ▽
VIEWING ENVIRONMENT          FLUORESCENT LIGHTING ▽
TYPE OF CONTENT              ANIME         ▽
MODEL                        ABC-14        ▽
                          741          742
                    TRANSMISSION    CANCEL
```

APPARATUS AND METHOD FOR MANAGING VIDEO AUDIO SETTING INFORMATION AND PROGRAM

CROSS REFERENCES TO RELATED APPLICATIONS

The present invention contains subject matter related to Japanese Patent Application JP 2007-268203 filed in the Japanese Patent Office on Oct. 15, 2007, the entire contents of which are incorporated herein by reference.

BACKGROUND OF THE INVENTION

1. Field of the Invention

The present invention relates to video audio setting information management apparatuses, and, more particularly, to an apparatus and method for managing setting information used for the output of a video signal or an audio signal and a program for causing a computer to execute the method.

2. Description of the Related Art

In recent years, video audio presentation apparatuses such as television receivers and DVD (Digital Versatile Disk) players have displayed a menu screen of adjustable items so as to allow a user to adjust a desired item.

However, in a case where video adjustment or audio adjustment is performed, changes made to individual adjustment items produce side effects and the side effects often interact with each other. As a result, it is difficult to keep a state conforming to the taste of a user. If the number of adjustment items is increased, such a phenomenon becomes more pronounced.

For example, Japanese Unexamined Patent Application Publication No. 2007-25294 discloses a technique for overcoming the above-described difficulty (see, FIG. 6). In this technique, an adjustment data file for each video content is stored in a server connected to a network. When a video content is viewed, the adjustment data file for the video content is downloaded from the server to an apparatus.

SUMMARY OF THE INVENTION

In the above-described technique in the related art, a user can obtain adjustment data for a video content to be viewed by selecting the title of the video content from among video titles included in a list.

However, focusing on only such adjustment data for a video content is inadequate to perform optimum adjustment for a user, since users have different viewing environments and different tastes. On the other hand, it is considered that the positively evaluated settings of adjustment items by many people tend to be similar.

It is desirable to provide an apparatus and method for managing video audio setting information in which each user has setting information of adjustment items of a video audio presentation apparatus conforming to the user's taste, these pieces of setting information of the users are shared, and recommendable setting information is provided in accordance with a condition on the basis of these pieces of setting information.

According to an embodiment of the present invention, there is provided a video audio setting information management apparatus, a video audio setting information management method of the video audio setting information management apparatus, and a program causing a computer to execute the method. The video audio setting information management apparatus includes: setting information storing means for associating each of a plurality of pieces of recommended setting information used to output a video signal or an audio signal with a corresponding viewing condition and storing them; setting information receiving means for receiving via a network each of the plurality of pieces of recommended setting information and the corresponding viewing condition; setting information registering means for registering each of the plurality of pieces of recommended setting information and the corresponding viewing condition so as to store them in the setting information storing means; recommendable setting information request receiving means for receiving a request for recommendable setting information and a corresponding viewing condition; condition extracting means for extracting a plurality of pieces of recommended setting information from the plurality of pieces of recommended setting information stored in the setting information storing means on the basis of the corresponding viewing condition that has been received along with the request; recommendable setting information deriving means for deriving recommendable setting information from the extracted plurality of pieces of recommended setting information; and recommendable setting information providing means for providing the derived recommendable setting information via the network. Consequently, recommendable setting information can be derived by extracting a viewing condition in response to a request from the setting information storing means storing pieces of recommended setting information.

The video audio setting information management apparatus may further include adequacy determining means for determining the adequacy of each of the plurality of pieces of recommended setting information. When the adequacy determining means determines that each of the plurality of pieces of recommended setting information is adequate, the setting information registering means may register each of the plurality of pieces of recommended setting information and the corresponding viewing condition so as to store them in the setting information storing means. Consequently, if recommended setting information is out of a predetermined range, the recommended setting information can be prevented from being stored.

The adequacy determining means may determine that each of the plurality of pieces of recommended setting information is adequate when the recommended setting information falls within a predetermined range in a distribution of the plurality of pieces of recommended setting information stored in the setting information storing means. Consequently, on the basis of the distribution of the pieces of recommended setting information stored in the setting information storing means, the adequacy of recommended setting information can be determined.

The recommendable setting information deriving means may derive the recommendable setting information from the extracted plurality of pieces of recommended setting information using a statistical method. In this case, the recommendable setting information deriving means may derive an average value of values of the extracted plurality of pieces of recommended setting information as the recommendable setting information. Alternatively, the recommendable setting information deriving means may derive at least one of the extracted plurality of pieces of recommended setting information which falls within a range of standard deviation as the recommendable setting information.

According to an embodiment of the present invention, each user has setting information of adjustment items of a video audio presentation apparatus conforming to the user's taste. These pieces of setting information of the users are shared.

On the basis of these pieces of setting information, recommendable setting information can be provided in accordance with a condition.

BRIEF DESCRIPTION OF THE DRAWINGS

FIG. 5 is a diagram illustrating an example of information stored in a setting information database according to an embodiment of the present invention;

FIG. 8 is a diagram illustrating an example of a viewing condition input screen displayed by a video audio presentation apparatus according to an embodiment of the present invention;

DESCRIPTION OF THE PREFERRED EMBODIMENTS

Next, an embodiment of the present invention will be described in detail below with reference to the accompanying drawings.

Figure 1:
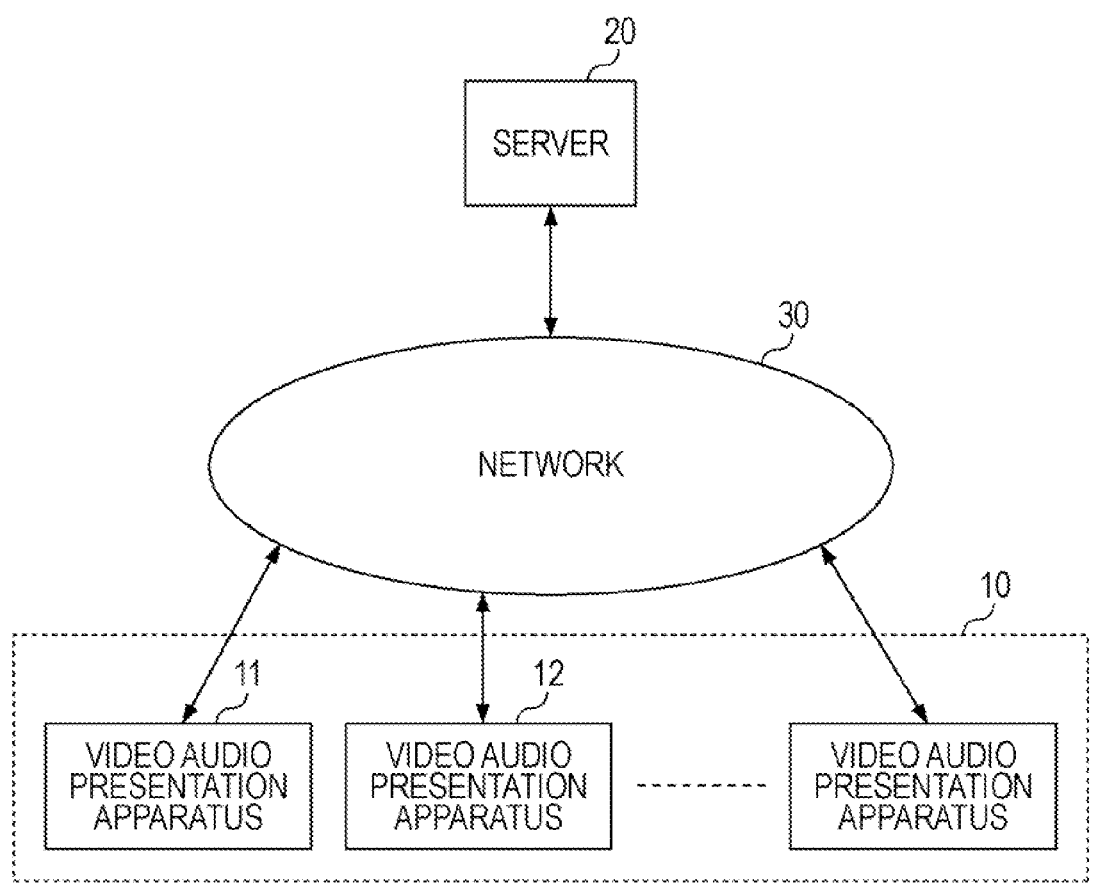
FIG. 1 is a diagram illustrating the entire configuration of a video audio setting information management system according to an embodiment of the present invention.

FIG. 1 is a diagram illustrating the entire configuration of a video audio setting information management system according to an embodiment of the present invention. In this video audio setting information management system, a video audio presentation apparatus group 10 and a server 20 are connected to each other via a network 30.

The video audio presentation apparatus group 10 includes a plurality of video audio presentation apparatuses for outputting a video signal or an audio signal, that is, video audio presentation apparatuses 11, 12, . . . . For example, such a video audio presentation apparatus is a television receiver or a home-theater system.

The server 20 is connected to the network 30 that is the Internet, a LAN, or the like, and functions as a server shared by the video audio presentation apparatuses included in the video audio presentation apparatus group 10. In an embodiment of the present invention, as will be described later, the server 20 stores setting information of adjustment items of a video audio presentation apparatus.

Figure 2:
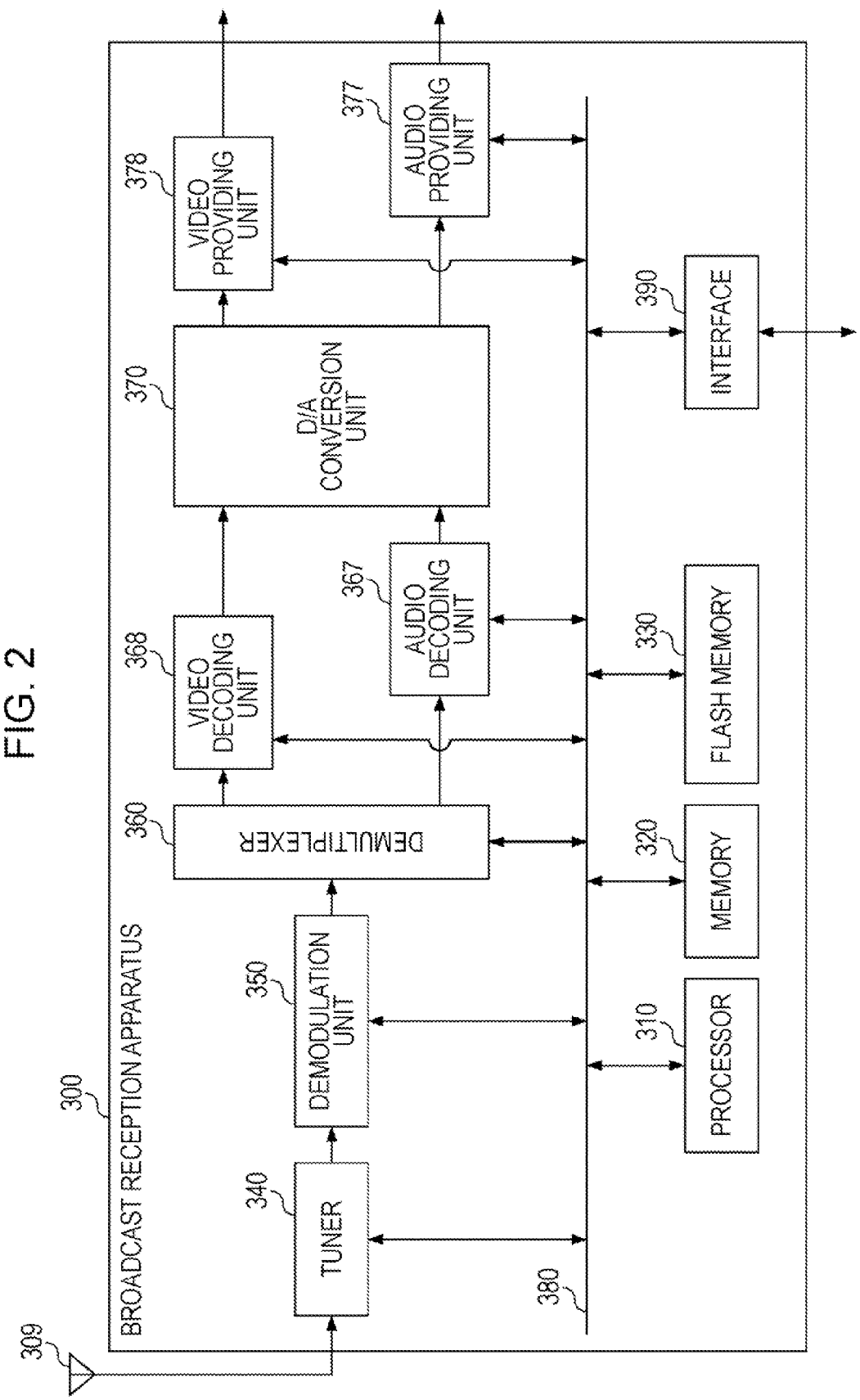
FIG. 2 is a diagram illustrating an exemplary configuration of a broadcast reception apparatus that is a concrete example of a video audio presentation apparatus according to an embodiment of the present invention.

FIG. 2 is a diagram illustrating an exemplary configuration of a broadcast reception apparatus 300 that is a concrete example of a video audio presentation apparatus according to an embodiment of the present invention. The broadcast reception apparatus 300 includes a processor 310, a memory 320, a flash memory 330, a tuner 340, a demodulation unit 350, a demultiplexer 360, an audio decoding unit 367, a video decoding unit 368, a digital-to analog (D/A) conversion unit 370, an audio providing unit 377, a video providing unit 378, and an interface 390. These components are connected to each other via a bus 380. The tuner 340 is connected to an antenna 309 that is an external apparatus.

The processor 310 controls the entire operation of the broadcast reception apparatus 300. The memory 320 is a main memory of the processor 310, and stores a program executed in the processor 310, etc. The flash memory 330 is a nonvolatile recording medium for storing information to be used after powering off the broadcast reception apparatus 300. Accordingly, when the broadcast reception apparatus 300 is powered on, information stored in the flash memory 330 is transferred to the memory 320.

The tuner 340 detects a predetermined channel signal from a broadcast signal supplied from the antenna 309 under the control of the processor 310, and supplies the detected channel signal to the demodulation unit 350. Such a broadcast signal may be a terrestrial signal or a satellite signal such as a broadcasting satellite (BS) signal or a communications satellite (CS) signal. The demodulation unit 350 demodulates the broadcast signal supplied from the tuner 340 under the control of the processor 310 so as to obtain data, and supplies the data to the demultiplexer 360. In the case of digital broadcasting, for example, digital modulation such as phase-shift keying (PSK) is performed. Accordingly, the demodulation unit 350 obtains data from a signal that has undergone digital modulation.

The demultiplexer 360 demultiplexes the data supplied from the demodulation unit 350 into audio data and video data, and supplies the audio data and the video data to the audio decoding unit 367 and the video decoding unit 368, respectively. In the case of digital broadcasting, for example, the demultiplexer 360 functions as a transport decoder for digital data, and demultiplexes an MPEG (Moving Picture Experts Group)-2 transport stream into an audio stream that is audio data and a video stream that is video data. In this case, the demultiplexer 360 also demultiplexes the transport stream into program specific information (PSI) and service information (SI).

The audio decoding unit 367 and the video decoding unit 368 decode the audio data and the video data which have been supplied from the demultiplexer 360, respectively, and supplies the decoding results to the D/A conversion unit 370. For example, the audio decoding unit 367 and the video decoding unit 368 perform MPEG decoding upon an audio stream and a video stream which have undergone MPEG coding so as to obtain an audio signal and a video signal, respectively.

The D/A conversion unit 370 converts a digital audio signal and a digital video signal which have been supplied from the audio decoding unit 367 and the video decoding unit 368 into an analog audio signal and an analog video signal, respectively, and supplies the analog audio signal and the analog video signal to the audio providing unit 377 and the video providing unit 378, respectively. The video signal (not illustrated) output from the video providing unit 378 is supplied to a display. The audio signal (not illustrated) output from the audio providing unit 377 is supplied to a speaker.

The interface 390 supplies an externally input operation signal to the bus 380 included in the broadcast reception apparatus 300. For example, the interface 390 is a receiver of a remote controller.

Figure 3:
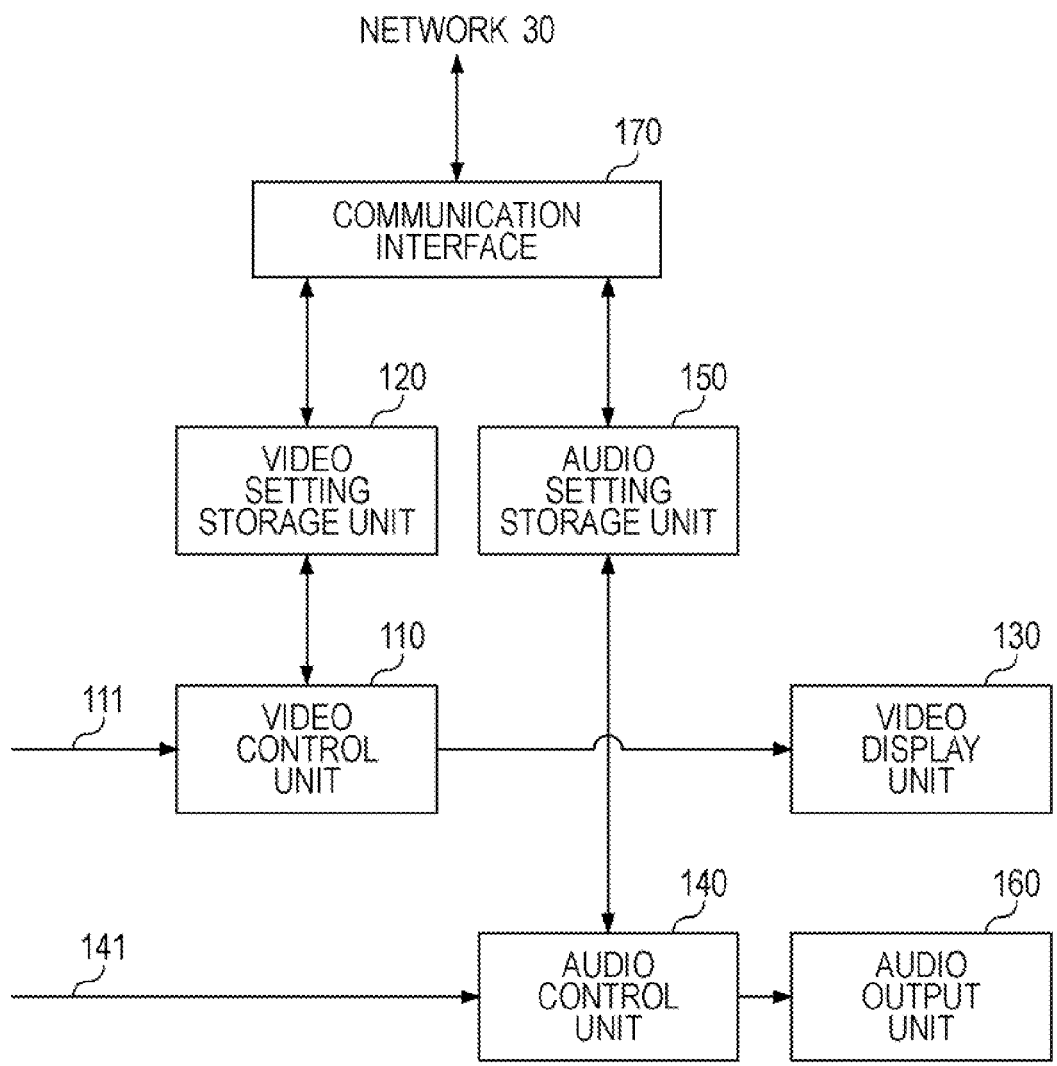
FIG. 3 is a diagram illustrating an exemplary configuration of the main part of a video audio presentation apparatus according to an embodiment of the present invention.

FIG. 3 is a diagram illustrating an exemplary configuration of the main part of a video audio presentation apparatus according to an embodiment of the present invention. A video audio presentation apparatus according to an embodiment of the present invention includes a video control unit 110, a video setting storage unit 120, a video display unit 130, an audio control unit 140, an audio setting storage unit 150, an audio output unit 160, and a communication interface 170.

The video control unit 110 performs control processing on the basis of video setting information stored in the video setting storage unit 120 so as to cause the video display unit 130 to display a picture using a video signal supplied through a signal line 111.

The video setting storage unit 120 stores video setting information used to output a video signal to the video display unit 130 for display. For example, adjustment items included in the video setting information are brightness representing the degree of brightness of a picture, contrast representing the degree of difference between the darker and lighter parts of a picture, sharpness representing the degree of intensity of a contour of a picture, mode representing the setting of a specific content, and noise reduction representing reduction in the level of coarse of a picture or reduction in color noise of the picture. Examples of the above-described mode include a sport mode appropriate for the display of sport content and a movie mode appropriate for movie viewing.

The video display unit 130 displays a picture using a video signal supplied from the video control unit 110, and, is, for example, a display apparatus such as an LCD (Liquid Crystal Display).

The audio control unit 140 performs control processing on the basis of audio setting information stored in the audio setting storage unit 150 so as to cause the audio output unit 160 to output an audio signal supplied through a signal line 141.

The audio setting storage unit 150 stores audio setting information used to output an audio signal to the audio output unit 160. Adjustment items included in the audio setting information are high-pitched sound volume representing the control of high-pitched sound volume, low-pitched sound volume representing the control of low-pitched sound volume, treble/bass emphasis representing the emphasis of treble or bass, surround representing the reproduction of surround sound such as 5.1-channel sound, etc.

The audio output unit 160 outputs an audio signal supplied from the audio control unit 140, and, is, for example, a speaker.

The communication interface 170 is an interface for communicating with the server 20 via the network 30. The communication interface 170 transmits the recommendation of video setting information or audio setting information and receives recommendable setting information.

Figure 4:
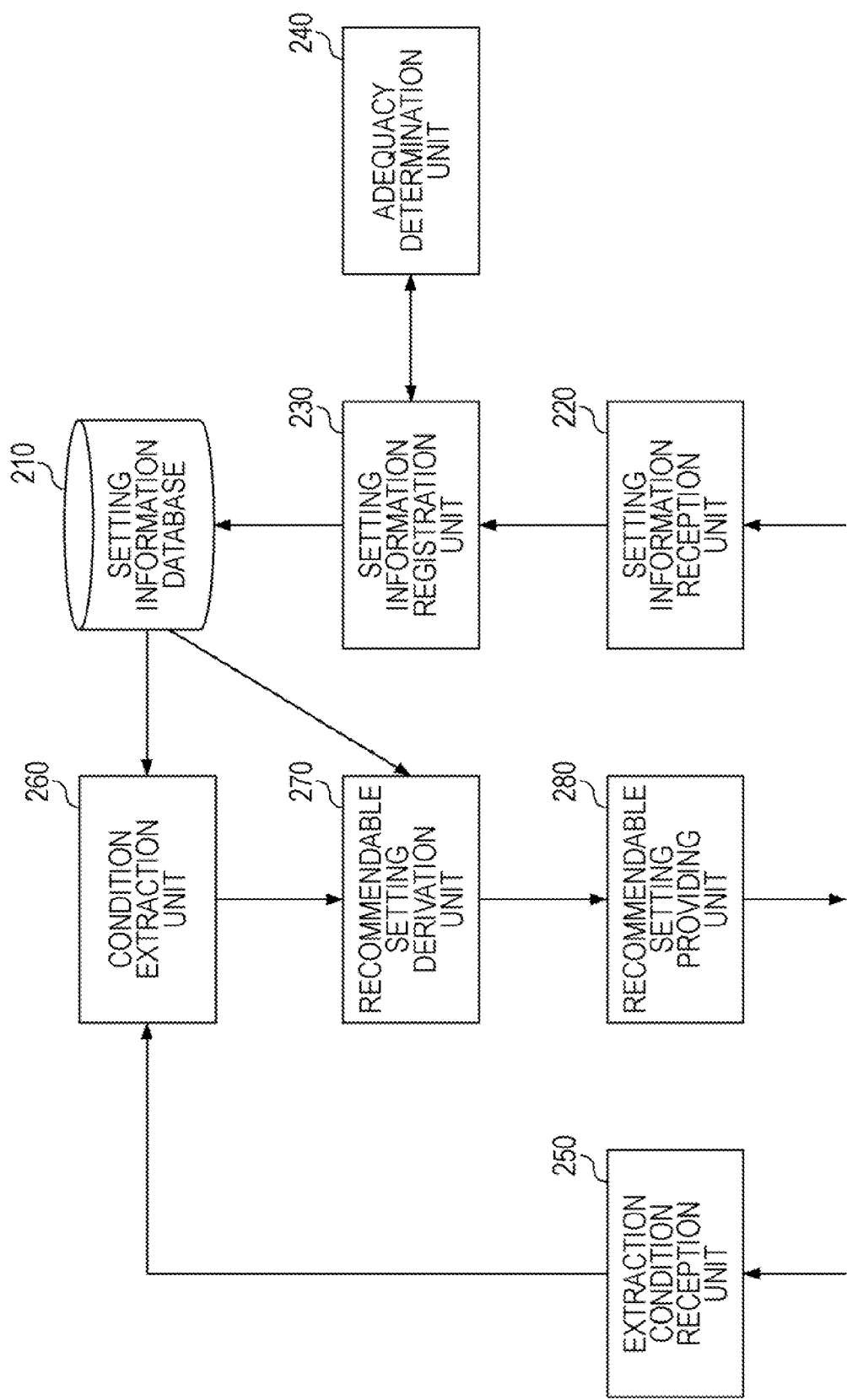
FIG. 4 is a diagram illustrating an exemplary configuration of the main part of a server according to an embodiment of the present invention.

FIG. 4 is a diagram illustrating an exemplary configuration of the main part of the server 20 according to an embodiment of the present invention. The server 20 includes a setting information database 210, a setting information reception unit 220, a setting information registration unit 230, an adequacy determination unit 240, an extraction condition reception unit 250, a condition extraction unit 260, a recommendable setting derivation unit 270, and a recommendable setting providing unit 280.

The setting information database 210 is a database for associating setting information used to output a video signal or an audio signal with a corresponding viewing condition and storing them. The setting information database 210 stores pieces of setting information received from the video audio presentation apparatus group 10 and viewing conditions associated with the pieces of setting information. Using the stored viewing conditions, extraction processing can be performed.

The setting information reception unit 220 receives via the network 30 setting information recommended by any one of the video audio presentation apparatuses included in the video audio presentation apparatus group 10 (hereinafter referred to as "recommended setting information") and a corresponding viewing condition. The setting information and the viewing condition received by the setting information reception unit 220 are supplied to the setting information registration unit 230.

The setting information registration unit 230 registers the setting information and the viewing condition received by the setting information reception unit 220 so as to store them in the setting information database 210. At the time of registration, the setting information registration unit 230 causes the adequacy determination unit 240 to determine the adequacy of the recommended setting information.

The adequacy determination unit 240 determines the adequacy of the recommended setting information to be stored in the setting information database 210. The adequacy determination unit 240 determines that the recommended setting information is adequate when the recommended setting information falls within a predetermined range in the distribution of pieces of setting information stored in the setting information database 210. For example, if a setting value of recommended setting information is larger than twice a standard deviation in the distribution of pieces of setting information registered in the setting information database 210, it is determined that the recommended setting information is inadequate. If the adequacy determination unit 240 determines that recommended setting information is inadequate, the setting information registration unit 230 does not register the recommended setting information.

The extraction condition reception unit 250 receives from any one of the video audio presentation apparatuses included in the video audio presentation apparatus group 10 a request for setting information to be recommended (hereinafter referred to as "recommendable setting information") selected from among pieces of setting information stored in the setting information database 210. The request for recommendable setting information is received along with a viewing condition to be extracted from the setting information database 210. The viewing condition is supplied to the condition extraction unit 260.

The condition extraction unit 260 extracts pieces of setting information stored in the setting information database 210 on the basis of the viewing condition supplied from the extraction condition reception unit 250. The extraction results are supplied to the recommendable setting derivation unit 270.

The recommendable setting derivation unit 270 derives recommendable setting information from the pieces of setting information extracted by the condition extraction unit 260 using a statistical method. In the statistical method, for example, the average value, mode value, or median value of specific item values of the extracted pieces of setting information can be used as recommendable setting information for the specific item. Alternatively, among specific item values of the extracted pieces of setting information, one or a plurality of the specific item values that falls or fall within the range of standard deviation can be used as recommendable setting information for the specific item.

The recommendable setting providing unit 280 supplies the recommendable setting information derived by the recommendable setting derivation unit 270 to a video audio presentation apparatus that has transmitted the request for recommendable setting information.

FIG. 5 is a diagram illustrating an example of information stored in the setting information database 210 according to an embodiment of the present invention. The setting information database 210 associates setting information of a video audio presentation apparatus with a viewing condition and stores them.

Setting information is used to output a video signal or an audio signal. Setting information is recommended by any one of the video audio presentation apparatuses included in the video audio presentation apparatus group 10 as recommended setting information. In this example, as adjustment items included in video setting information, brightness, contrast, sharpness, mode, and noise reduction are illustrated. However, other adjustment items may be used.

A viewing condition is fundamental to corresponding setting information. In this example, as personal information of a person who has recommended corresponding setting information, age, sex, and the area of residence are illustrated. As a viewing environment appropriate for the setting information, information about ambient lighting is illustrated. The type of content appropriate for the setting information is illustrated. Furthermore, the model of a video audio presentation apparatus having the setting information is illustrated. The above-described viewing condition is only an example. Another viewing condition may be stored.

There is a one-to-one correspondence between setting information and a viewing condition. The setting information database 210 associates setting information and a viewing condition with each other and stores them. For example, in the case of a 20-year-old man illustrated in the drawing, the values of brightness, contrast, and sharpness are "50", mode is "off", and noise reduction is "off".

Setting information and a viewing condition are registered as described above. The condition extraction unit 260 extracts a viewing condition matching a received viewing condition, and supplies setting information associated with the extracted viewing condition to the recommendable setting derivation unit 270.

Figure 6:
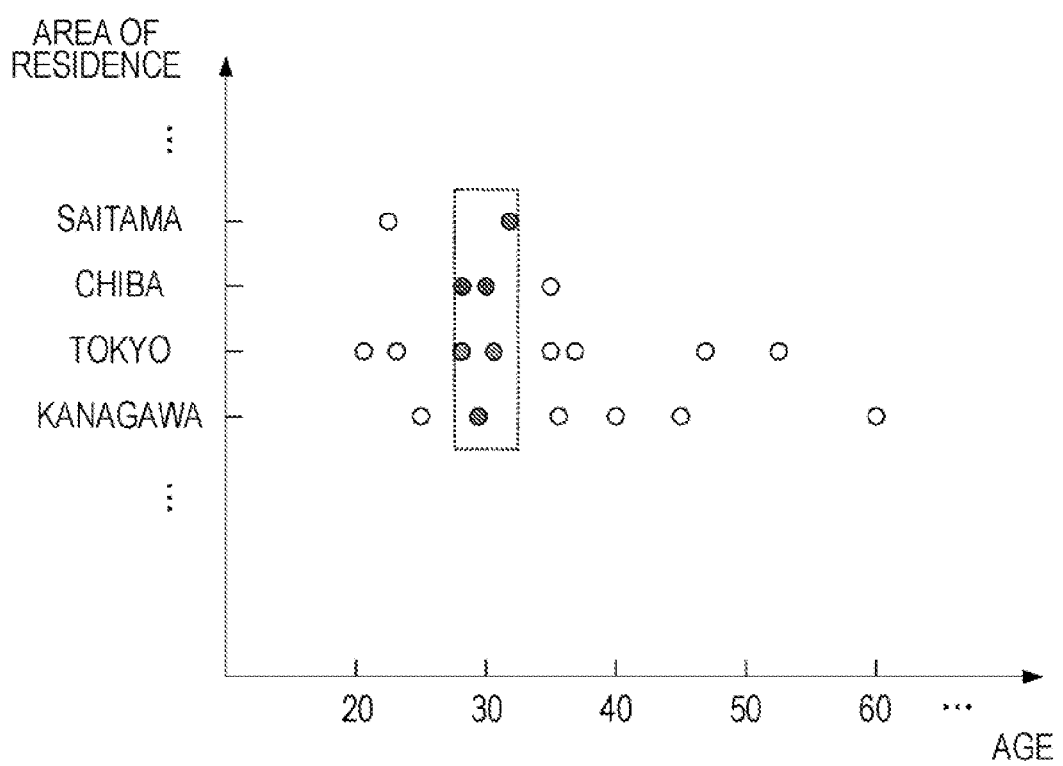
FIG. 6 is a diagram illustrating exemplary condition extraction processing performed by a condition extraction unit according to an embodiment of the present invention.

FIG. 6 is a diagram illustrating exemplary condition extraction processing performed by the condition extraction unit 260 according to an embodiment of the present invention. The condition extraction unit 260 performs condition extraction processing on the basis of a viewing condition received by the extraction condition reception unit 250 along with a request for recommendable setting information.

In this example, the age range from 28 to 32 is specified, and Saitama, Chiba, and Tokyo are specified as the area of residence. As a result, six pieces of setting information corresponding to shaded circles in the drawing are selected as matching extraction conditions.

Thus, in the condition extraction processing, setting information satisfying all viewing conditions supplied from the extraction condition reception unit 250 is selected. In this example, two items, that is, age and the area of residence, are provided as extraction conditions. However, any combination of items may be provided.

As a result of the above-described condition extraction, a plurality of corresponding pieces of setting information may be selected. In this case, the recommendable setting derivation unit 270 derives recommendable setting information from the extracted pieces of setting information using a statistical method. In the statistical method, for example, the average value, mode value, or median value of specific item values of the extracted pieces of setting information can be used as recommendable setting information for the specific item. For example, an average value $B_{avg}$ of specific item values (for example, the values of brightness $B_1$ to $B_N$) of N pieces of extracted setting information is calculated as follows.

$$B_{avg} = (B_1 + B_2 + \ldots + B_N)/N$$

An average value calculated as above can be provided as setting information.

Alternatively, among specific item values of the pieces of extracted setting information, one or a plurality of the specific item values which falls or fall within the range of standard deviation can be used as recommendable setting information for the specific item. Here, a standard deviation $\sigma$ is the positive square root of a variance $\sigma^2$. For example, a variance $\sigma_B^2$ of specific item values (for example, values of brightness $B_1$ to $B_N$) of the N pieces of extracted setting information can be calculated as follows.

$$\sigma_B^2 = ((B_1 - B_{avg})^2 + (B_2 - B_{avg})^2 + \ldots + (B_N - B_{avg})^2)/N$$

A standard deviation is obtained from a variance calculated as above, and pieces of setting information that fall within the range of the obtained standard deviation can be sequentially provided.

Figure 7:
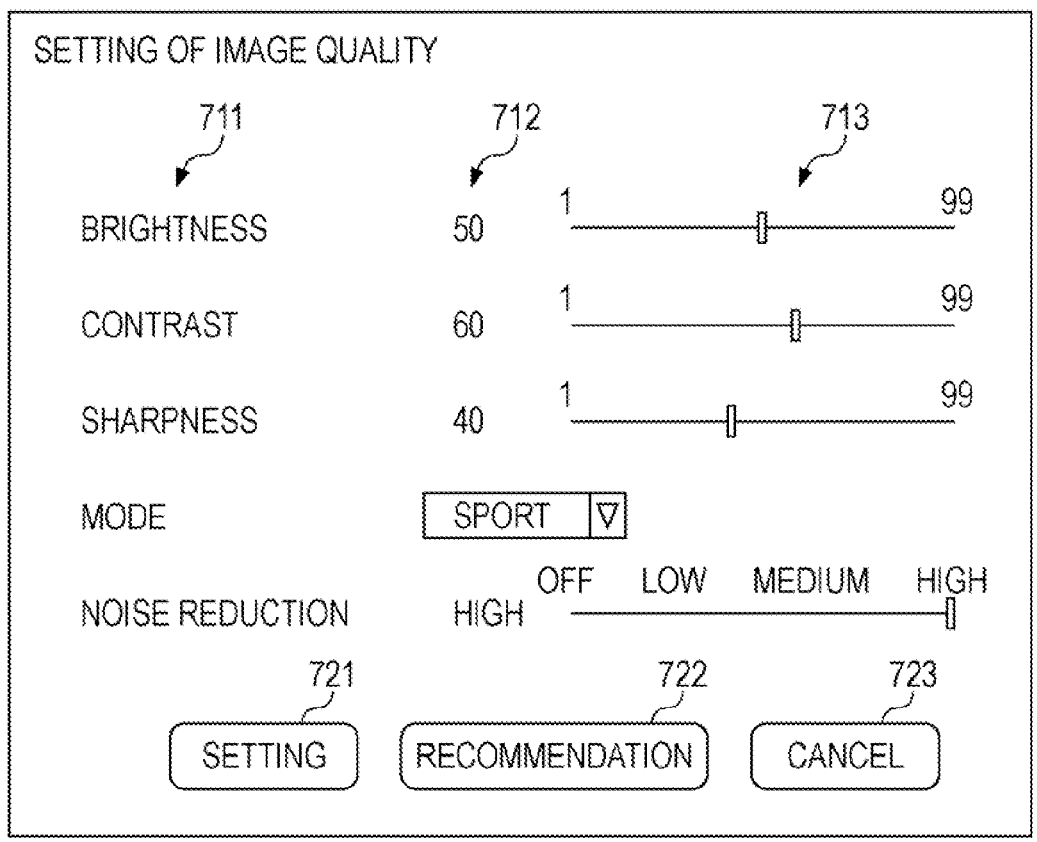
FIG. 7 is a diagram illustrating an example of a setting information recommendation screen displayed by a video audio presentation apparatus according to an embodiment of the present invention.

FIG. 7 is a diagram illustrating an example of a setting information recommendation screen displayed by a video audio presentation apparatus according to an embodiment of the present invention. In a video audio presentation apparatus for recommending setting information, setting information is input using this screen.

For an adjustment item 711 on the left side, a user performs setting input processing in an input area 713 on the right side. As a result, a setting value 712 input by the user is displayed in the center of the screen. In this example, the number of the adjustment items 711 is limited to five. However, setting values of other items may be input.

If a setting button 721 is pressed, on the basis of the setting value 712, a picture is displayed or sound is output. If a recommendation button 722 is pressed, an input screen of a viewing condition is displayed. On the other hand, a cancel button 723 is pressed, setting input processing for the adjustment item 711 is canceled.

FIG. 8 is a diagram illustrating an example of a viewing condition input screen displayed by a video audio presentation apparatus according to an embodiment of the present invention. For a condition item 731 on the left side, a user inputs a viewing condition in an input area 732 on the right side. If a transmission button 741 is pressed, this viewing condition and setting information are transmitted from the communication interface 170 to the server 20. On the other hand, a cancel button 742 is pressed, the transmission of setting information is canceled.

Figure 9:
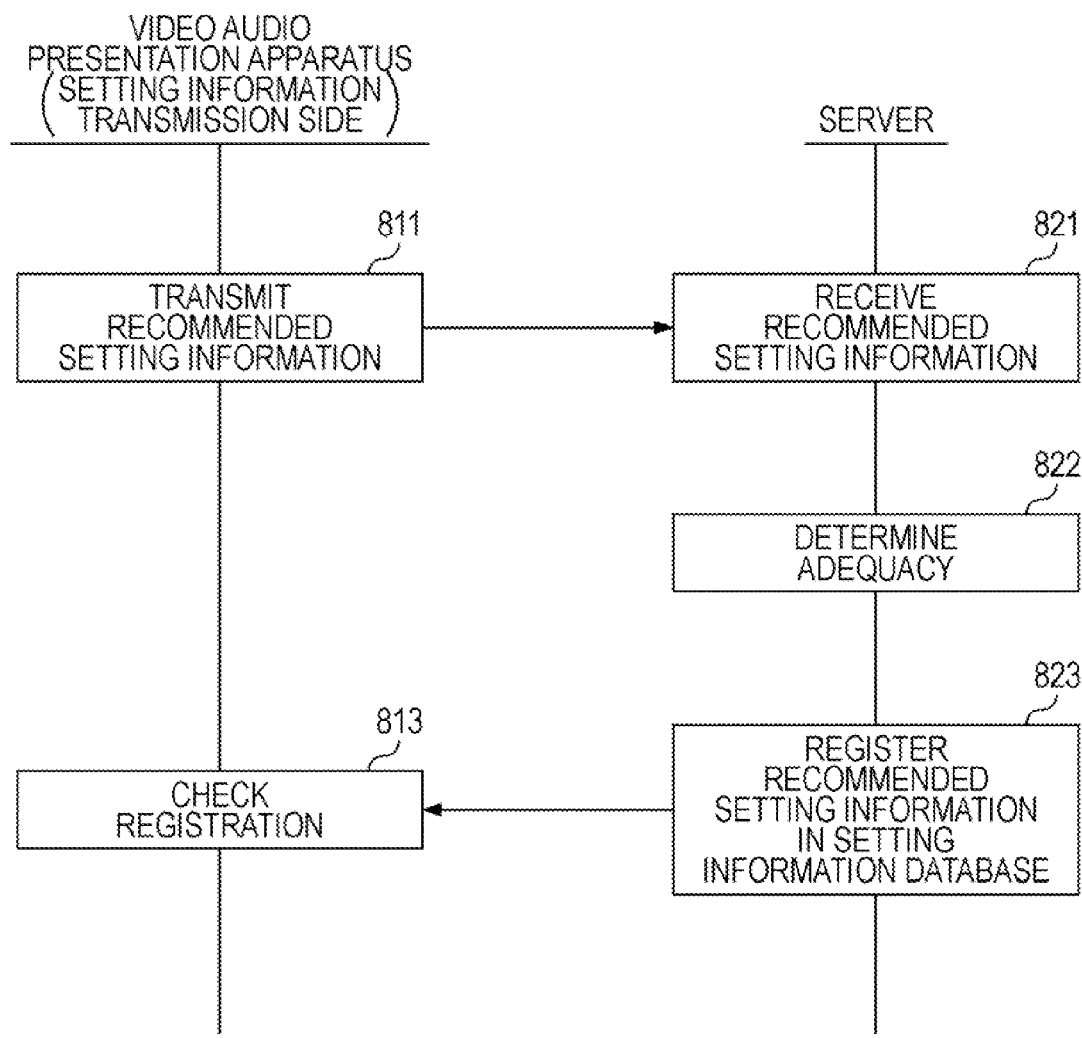
FIG. 9 is an exemplary sequence chart of a recommended setting information registration process in which recommended setting information supplied from a video audio presentation apparatus according to an embodiment of the present invention is registered in a server.

FIG. 9 is an exemplary sequence chart of a recommended setting information registration process in which recommended setting information supplied from a video audio presentation apparatus according to an embodiment of the present invention is registered in the server 20.

If a video audio presentation apparatus transmits recommended setting information (811), the server 20 receives the transmitted recommended setting information (821). The server 20 determines the adequacy of the recommended setting information (822). If it is determined that the recommended setting information is adequate, the server 20 associates the recommended setting information with a corresponding viewing condition and registers them in the setting information database 210. Information about whether the setting information and the viewing condition have been registered is transmitted from the server 20 to the video audio presentation apparatus (813).

If the recommended setting information is registered, information notifying a user about the registration of the recommended setting information is displayed on a screen.

On the other hand, if it is determined that the recommended setting information is inadequate since it does not fall within an appropriate range, information notifying a user that the registration of the recommended setting information has been rejected is displayed on a screen along with the reason therefor.

Figure 10:
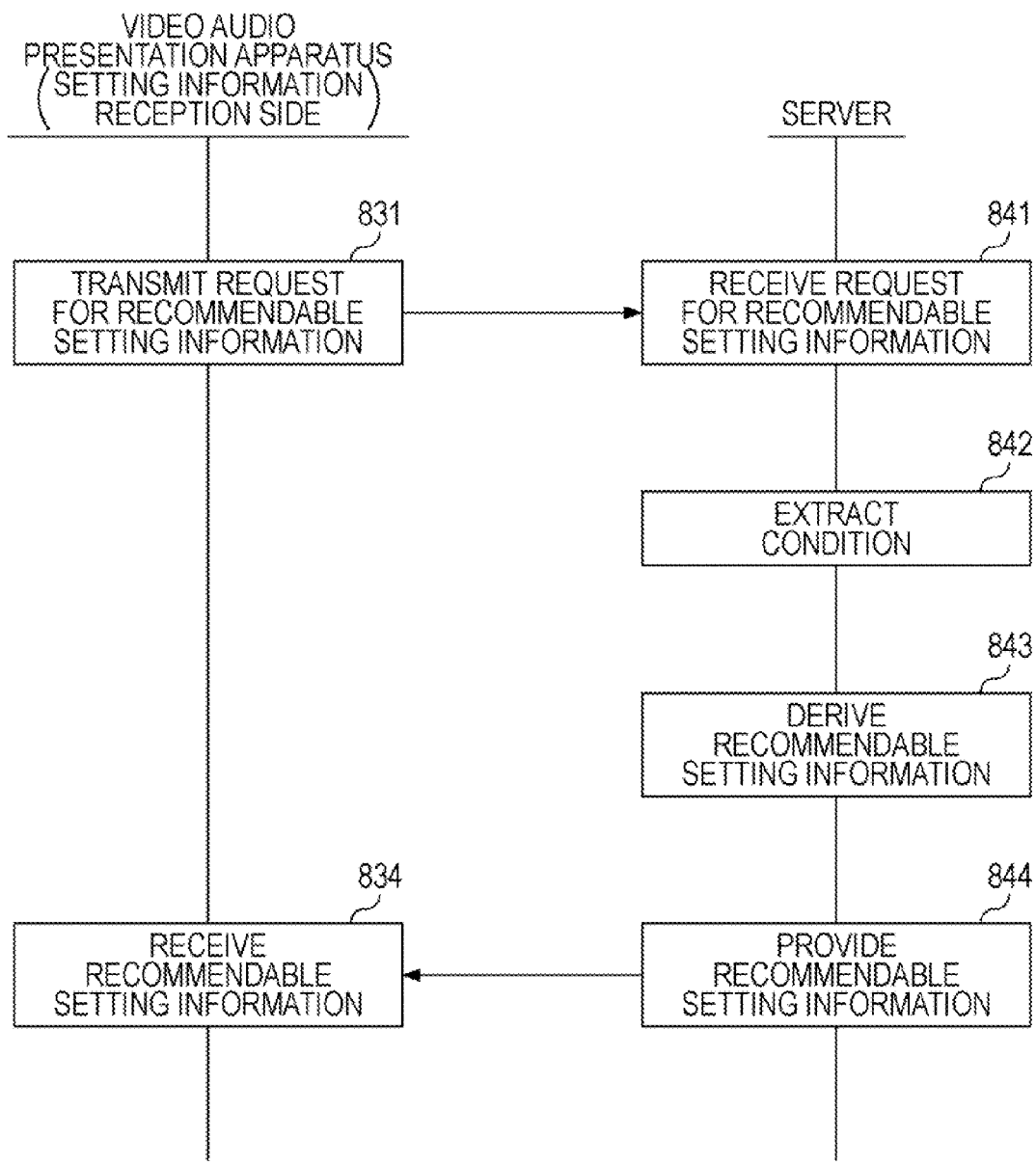
FIG. 10 is an exemplary sequence chart of a recommendable setting information providing process in which a server according to an embodiment of the present invention provides recommendable setting information for a video audio presentation apparatus.

FIG. 10 is an exemplary sequence chart of a recommendable setting information providing process in which the server 20 according to an embodiment of the present invention provides recommendable setting information for a video audio presentation apparatus.

If a video audio presentation apparatus transmits a request for recommendable setting information (831), the server 20 receives the request (841). As a result, the server 20 extracts pieces of setting information registered in the setting information database 210 on the basis of a viewing condition received with the request (842). The server 20 derives recommendable setting information from the extracted pieces of setting information (843). The derived recommendable setting information is supplied from the server 20 to the video audio presentation apparatus (844 and 834).

Figure 11:
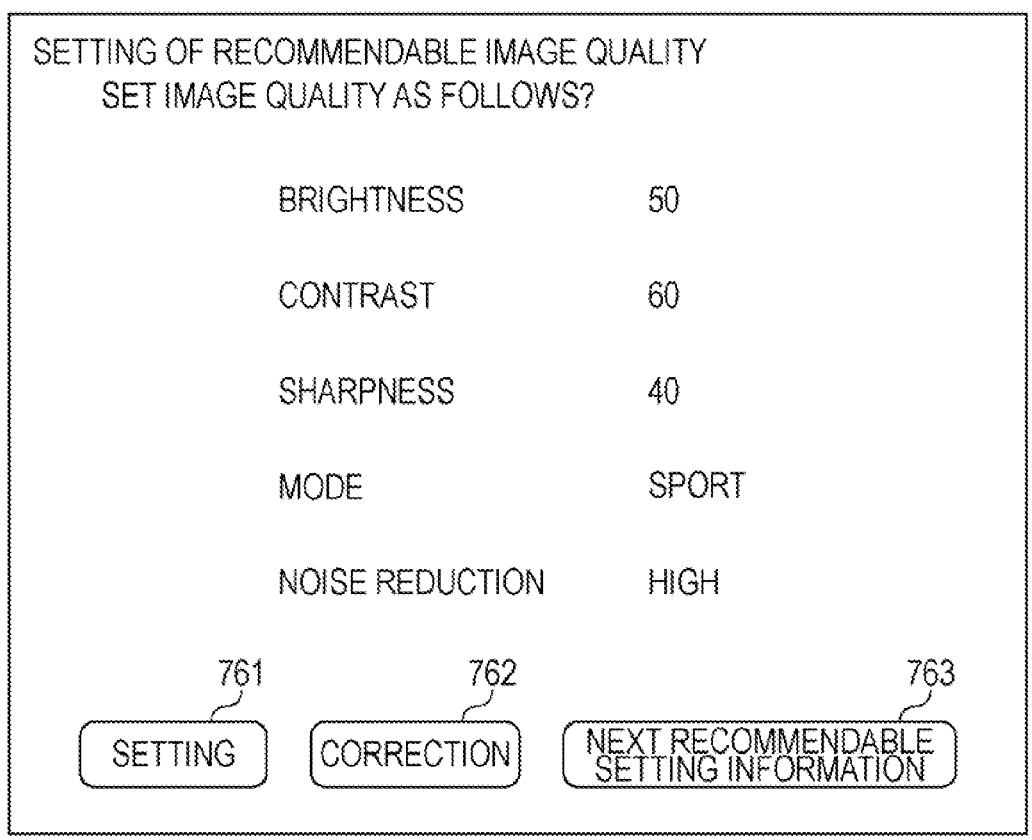
FIG. 11 is a diagram illustrating an example of a recommendable setting information confirmation screen displayed by a video audio presentation apparatus according to an embodiment of the present invention.

FIG. 11 is a diagram illustrating an example of a recommendable setting information confirmation screen displayed by a video audio presentation apparatus according to an embodiment of the present invention. A video audio presentation apparatus receives recommendable setting information from the server 20, and displays the recommendable setting information on a screen so as to cause a user to determine whether setting is performed on the basis of the recommendable setting information. In this example, five adjustment items are displayed. However, the number of adjustment items is not limited thereto.

If a setting button 761 is pressed, the displayed setting information is stored in the video setting storage unit 120 or the audio setting storage unit 150. On the basis of the stored setting information, a picture is displayed or sound is output. If a correction button 762 is pressed, a correction screen for the setting information is displayed. On this correction screen, an input area similar to the input area 713 of the setting information recommendation screen illustrated in FIG. 7 is displayed.

If a next recommendable setting information button 763 is pressed, next recommendable setting information selected from among pieces of recommendable setting information is displayed. As described previously, a plurality of pieces of recommendable setting information may exist. In this case, for example, pieces of recommendable setting information that fall within the range of standard deviation are sequentially displayed in the order of closeness to an average value. A user can select recommendable setting information closer to the user's taste from among these pieces of recommendable setting information.

Figure 12:
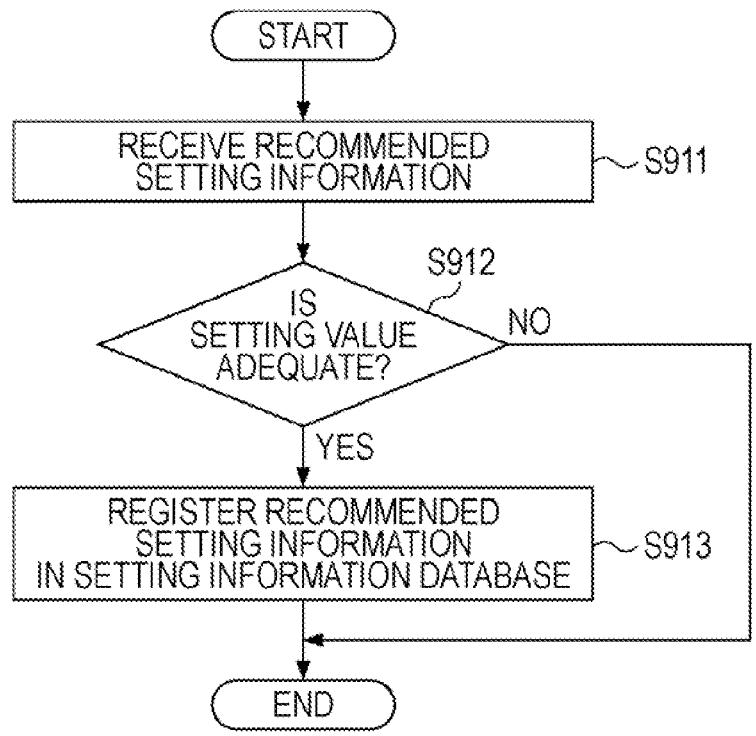
FIG. 12 is a flowchart of an exemplary recommended setting information registration process performed by a server according to an embodiment of the present invention.

FIG. 12 is a flowchart of an exemplary recommended setting information registration process performed by the server 20 according to an embodiment of the present invention.

If the setting information reception unit 220 receives recommended setting information from a video audio presentation apparatus (step S911), the adequacy determination unit 240 determines whether the setting value of the received recommended setting information is adequate (step S912). If it is determined that the recommended setting information is adequate, the setting information registration unit 230 registers the recommended setting information and a corresponding viewing condition in the setting information database 210 (step S913).

Figure 13:
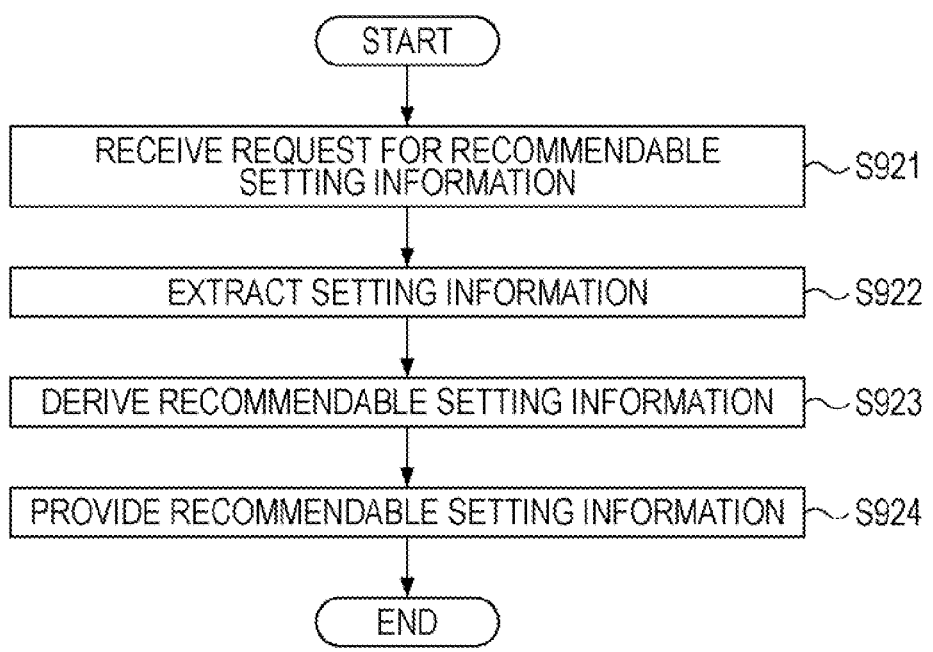
FIG. 13 is a flowchart of an exemplary recommendable setting information providing process performed by a server according to an embodiment of the present invention.

FIG. 13 is a flowchart of an exemplary recommendable setting information providing process performed by the server 20 according to an embodiment of the present invention.

If the extraction condition reception unit 250 receives a request for recommendable setting information from a video audio presentation apparatus (step S921), the condition extraction unit 260 extracts pieces of setting information registered in the setting information database 210 on the basis of a viewing condition received with the request (step S922). On the basis of the extraction result, the recommendable setting derivation unit 270 derives recommendable setting information from the extracted pieces of setting information (step S923). The recommendable setting providing unit 280 supplies the derived recommendable setting information to the video audio presentation apparatus from which the request for recommendable setting information has been supplied (step S924).

As described previously, according to an embodiment of the present invention, video audio presentation apparatuses included in the video audio presentation apparatus group 10 can share pieces of setting information registered in the setting information database 210 included in the server 20. The condition extraction unit 260 extracts pieces of setting information associated with a viewing condition of a video audio presentation apparatus from the pieces of setting information registered in the setting information database 210. The recommendable setting derivation unit 270 derives recommendable setting information from the extracted pieces of setting information using a statistical method. At the time of recommendation of setting information, the adequacy determination unit 240 determines the adequacy of the setting information.

An embodiment of the present invention has been described by way of example. The correspondence between the features of the claims and the specific elements disclosed in an embodiment of the present invention will be described below. It is obvious that various modifications of an embodiment can be made by those skilled in the art without departing from the spirit and scope of the present invention.

That is, for example, a setting information storage unit corresponds to the setting information database 210. For example, a setting information reception unit corresponds to the setting information reception unit 220. For example, a setting information registration unit corresponds to the setting information registration unit 230. For example, a recommendable setting information request unit corresponds to the extraction condition reception unit 250. For example, a condition extraction unit corresponds to the condition extraction unit 260. For example, a recommendable setting information derivation unit corresponds to the recommendable setting derivation unit 270. For example, a recommendable setting information providing unit corresponds to the recommendable setting providing unit 280.

For example, an adequacy determination unit corresponds to the adequacy determination unit 240.

For example, a setting information storage unit corresponds to the setting information database 210. For example, a setting information reception process corresponds to step S911. For example, a setting information registration process corresponds to step S913. For example, a recommendable setting information request reception process corresponds to step S921. For example, a condition extraction process corresponds to step S922. For example, a recommendable setting information derivation process corresponds to step S923. For example, a recommendable setting information providing process corresponds to step S924.

The processing flows described in an embodiment of the present invention may be considered as a method having a series of these processing flows, a program causing a computer to perform the series of these processing flows, or a recording medium storing the program.

What is claimed is:

1. A video audio setting information management apparatus comprising:
    a setting information storing portion associating a first plurality of pieces of recommended setting information used to output a video signal or an audio signal with first corresponding viewing conditions and storing the associated information, the first corresponding viewing conditions comprising at least a piece of personal information of a user independent of the video signal or audio signal;
    a setting information receiving portion receiving via a network a second plurality of pieces of recommended setting information and second corresponding viewing conditions;
    an adequacy determining portion determining that the second plurality of pieces of recommended setting information are adequate when the second plurality of pieces of recommended setting information falls within a predetermined range in a distribution of the first plurality of pieces of recommended setting information stored in the setting information storing portion;
    a setting information registering portion registering the second plurality of pieces of recommended setting information and the second corresponding viewing conditions in the setting information storing portion based on the determination results of the adequacy determining portion;
    a recommendable setting information request receiving portion receiving a request for recommendable setting information and a user viewing condition;
    a condition extracting portion extracting a third plurality of pieces of recommended setting information from the plurality of stored pieces of recommended setting information on the basis of the user viewing condition;
    a recommendable setting information deriving portion deriving recommendable setting information from the extracted third plurality of pieces of recommended setting information; and
    a recommendable setting information providing portion providing the derived recommendable setting information via the network.

2. The video audio setting information management apparatus according to claim 1, wherein the recommendable setting information deriving portion derives the recommendable setting information from the extracted third plurality of pieces of recommended setting information using a statistical method.

3. The video audio setting information management apparatus according to claim 2, wherein the recommendable setting information deriving portion derives an average value of values of the extracted third plurality of pieces of recommended setting information as the recommendable setting information.

4. The video audio setting information management apparatus according to claim 2, wherein the recommendable setting information deriving portion derives at least one of the extracted third plurality of pieces of recommended setting information which falls within a range of standard deviation as the recommendable setting information.

5. A video audio setting information management method of a video audio setting information management apparatus, the method comprising:
    associating a first plurality of pieces of recommended setting information used to output a video signal or an audio signal with first corresponding viewing conditions, the first corresponding viewing conditions comprising at least a piece of personal information of a user independent of the video signal or audio signal;
    storing the associated information;
    receiving via a network a second plurality of pieces of recommended setting information and second corresponding viewing conditions;
    determining that the second plurality of pieces of recommended setting information are adequate when the second plurality of pieces of recommended setting information falls within a predetermined range in a distribution of the first plurality of pieces of recommended setting information;
    registering the second plurality of pieces of recommended setting information and the second corresponding viewing conditions in a setting information storing portion based on the adequacy determination results;
    receiving a request for recommendable setting information and a user viewing condition;
    extracting a third plurality of pieces of recommended setting information from the plurality of pieces of recommended setting information stored in the setting information storing portion on the basis of the user viewing condition;
    deriving recommendable setting information from the extracted third plurality of pieces of recommended setting information; and
    providing the derived recommendable setting information via the network.

6. A non-transitory computer-readable recording medium tangibly storing a program causing a computer to execute the video audio setting information management method according to claim 5.

7. A video audio setting information management apparatus comprising:
    a setting information storage unit configured to associate a first plurality of pieces of recommended setting information used to output a video signal or an audio signal with first corresponding viewing conditions and store the associated information, the first corresponding viewing conditions comprising at least a piece of personal information of a user independent of the video signal or audio signal;

a setting information reception unit configured to receive via a network a second plurality of pieces of recommended setting information and second corresponding viewing conditions;

an adequacy determining unit determining that the second plurality of pieces of recommended setting information are adequate when the second plurality of pieces of recommended setting information falls within a predetermined range in a distribution of the first plurality of pieces of recommended setting information stored in the setting information storing unit;

a setting information registration unit configured to register the second plurality of pieces of recommended setting information and the second corresponding viewing conditions in the setting information storage unit based on the determination results of the adequacy determining unit;

a recommendable setting information request reception unit configured to receive a request for recommendable setting information and a user viewing condition;

a condition extraction unit configured to extract a third plurality of pieces of recommended setting information from the plurality of pieces of recommended setting information stored in the setting information storage unit on the basis of the user viewing condition;

a recommendable setting information derivation unit configured to derive recommendable setting information from the extracted third plurality of pieces of recommended setting information; and a recommendable setting information providing unit configured to provide the derived recommendable setting information via the network.

* * * * *